United States Patent Office 2,982,695
Patented May 2, 1961

2,982,695
PROCESS FOR MONOHYDROXYLATION OF STEROIDS

Robert H. Blank, Anthony J. Shay, and Louis M. Pruess, Pearl River, N.Y., and Neil E. Rigler, Ridgewood, N.J., assignors to American Cyanamid Company, New York, N.Y., a corporation of Maine No Drawing. Filed July 17, 1959, Ser. No. 827,698

11 Claims. (Cl. 195—51)

This invention relates to the monohydroxylation of steroids. More particularly, this invention relates to the microbiological monohydroxylation of steroids of the pregnene series by the action of fungi of the class Basidiomycetes.

The microbiological fermentation of steroids to produce monohydroxylation is well known. In U.S. Patent No. 2,789,940 a microbiological process for the conversion of Reichstein's Substance S to hydrocortisone is described and claimed. However, there is no microbiological process heretofore described which will produce as major products three monohydroxylated steroids of the pregnene series as described hereinafter.

The process of the present invention is a fermentative oxidation using fungi of the class Basidiomycetes. The genuses Coriolus, Polyporus and Poria are particularly useful in the present process; for example, Coriolus versicolor (ATCC No. 13,488) (D-10), Polyporus tulipiferus (ATCC No. 13,489) (D-15), Polyporus cinnabarinus (D-6) or Poria cocos (ATCC No. 13,490) (D-107). A description of the fungus Coriolus versicolor is given by F. L. Stevens (Plant Disease Fungi, page 304, Macmillan Co., New York, 1942) under the former generic name Polystictus. Polyporus tulipiferus is described by Darley and Christensen in Phytopathology 35, 220–222 (1945). The fungus Poria cocos is described by Weber in Mycologia 21, 113–130 (1929) and also by Wolf in Jour. Elisha Mitchell Soc. 38, 127–137 (1922).

In carrying out the present process a fungus of the class Basidiomycetes is prepared in aqueous suspension from agar slants or other sources, and added to a prepared medium consisting of a source of carbon, nitrogen and mineral elements. The sources of carbon are well known to the microbiologist and include corn starch, molasses, maltose, sucrose, glycerol and mannitol; various organic acids such as citric, malic, acetic; various natural products containing carbohydrates such as corn steep liquor, soybean meal, cotton seed meal and many other available materials which have been used heretofore as a source of carbon in fermentation processes. Usually a variety of the above can be used in the medium with good results.

Sources of nitrogen include some of the above enumerated materials such as corn steep liquor, soybean meal, cotton seed meal and the like. Other sources can be beef extract, casein, yeast, enzymatically digested proteins and degradation products including peptones, amino acids and other proteinaceous materials. Various inorganic sources of nitrogen including ammonium salts, nitrates and the like may also be used as a source of assimilable nitrogen to provide a favorable growth substrate for fungi of the Basidiomycetes class.

Often, much of the mineral requirements of the fermentation are present in the crude materials that are used to furnish a source of carbon and nitrogen or occur in the water that is used in the process. Usually, however, it is advisable to supplement the minerals normally present with added amounts to obtain maximum growth of the fungus. Cations and anions are desirable in added amounts including phosphate, sulfate, chloride, sodium, potassium, magnesium, iron, calcium, cobalt, manganese and various others. Since the use of mineral elements in supporting the growth of fungi is well understood, elaboration appears to be unnecessary.

Steroids of the pregnene series useful in the process of the present invention are Reichstein's Substance S, 21-hydroxy progesterone and the like.

The fungi of the Basidiomycetes class grow at all temperatures between 10° and 35° C. and it is possible to carry out the oxidation process within these ranges. Temperatures between 15° and 30° C. are preferred. The reaction usually is carried out at about 28° C.

During the fermentation process, aeration is provided by forcing sterile air through the medium. Mechanical agitation is also used to keep the mycelium and other insoluble materials in suspension. Antifoaming agents such as silicone, glycerides, oils and the like may be added from time to time in the amounts needed.

In carrying out the process of the present invention the fungus is preferably grown in a suitable medium such as described hereafter in the examples until sufficient growth is exhibited. This period is usually about two days. The pregnene to be oxidized is then added to the fermentation medium in solution, it having been previously dissolved in an alcohol or other solvent which will not adversely effect the fermentation.

Following the completion of the reaction which can be determined by paper chromatographic analysis, the mycelium is removed and the filtrate extracted with a solvent such as methylene dichloride, chloroform, or ethyl acetate. The desired products can then be obtained by removal of the solvent and purification in a well known manner.

In large scale fermentations, the crude product or products may be recovered from the fermentation beer by simple solvent extraction using a suitable water-immiscible solvent such as chlorinated lower hydrocarbons, esters, ketones and the like. Further purification and separation of the steroid products from the extract may be accomplished by well known methods. Separation of steroid mixtures often require the use of chromatography.

The compounds of the present invention have glucocorticoid activity and therefore are useful in the treatment of arthritis, bursitis and other collagen diseases.

The following specific examples illustrate in detail the monohydroxylation of steroids of the pregnene series.

Example 1

An aqueous suspension of growth from a test tube agar plant of Polyporus tulipiferus is divided into 6 portions as inoculum for 6–500 ml. flasks, each of the latter containing 100 ml. of a medium composed of 0.22% soybean meal, 0.3% corn steep liquor, 1.0% glucose, 0.25% yeast extract, 0.3% ammonium dihydrogen phosphate and 0.25% calcium carbonate (pH adjusted to 7.0 with sodium hydroxide). The six flasks are placed on a reciprocating shaker at 26–28° C. until sufficient growth (usually 2 days) is exhibited. At this point flasks 1 and 2, 3 and 4, and 5 and 6, respectively, are combined and used as inoculum for three bottles each containing 12 liters of a medium consisting of 5% dextrose, 2.0% corn steep liquor and 0.2% $K_2HPO_4$. The three bottles designated 1, 2, and 3 are kept at 26–28° C. until the aerated, mechanically stirred growth is satisfactory. At this time the substrate is added as a methanol solution and the fermentation allowed to continue until paper strip chromatography shows the substrate to be exhausted. The three bottles are then harvested, the contents pooled and used for isolation studies.

| Bottle | Temp., °C., of Fermentation | Prefermentation time | Fermentation time | Total Time | Substrate |
|---|---|---|---|---|---|
| 1 | 26–28 | 96 | 46 | 142 | 0.2 mg. of Substance S per ml. medium. |
| 2 | 26–28 | 48 | 22 | 70 | Do. |
| 3 | 26–28 | 48 | 22 | 70 | Do. |

The products obtained are 14α-hydroxy Substance S, 6β-hydroxy Substance S and 15β-hydroxy Substance S.

Example 2

Thirty-six liters of fermentation beer prepared as in Example 1 is filtered to remove the mycelia, and the filtrate is extracted twice with equal volumes of ethyl acetate. The ethyl acetate extracts are pooled and washed with 1/10 their volume of a 2% sodium bicarbonate solution, and the washed extract is concentrated under reduced pressure. The concentrated extract is dried with sodium sulfate, treated with 2 g. of activated carbon, and filtered. The filtrate is concentrated to a residue and chromatographed on a 1 kg. diatomaceous earth column using a water:dioxane:cyclohexane system (1:5:4). The peak fractions of the 14α-hydroxy, 6β-hydroxy, and 15β-hydroxy derivatives, as shown by U.V. absorbancy (designated A, B, and C, and appearing at 1.0, 2.16, and 3.9 H.B.V., respectively), are collected, and each is concentrated to dryness, taken up into 150 ml. of hot ethyl acetate, treated with 1 g. of activated carbon, and filtered. The three filtrates (A, B, and C) are each concentrated to about 25 ml. and chilled. B and C readily crystallize out and are removed by centrifugation and recrystallized from hot methanol, yielding 178 mg. of B and 162 mg. of C. The A material, because of its greater solubility, is taken to dryness and crystallized from methanol-ether, yielding 61 mg.

All three substances analyze for trihydroxy-pregnene-diones. A is 14α-hydroxy S (14α,17α,21-trihydroxy-4-pregnene-3,20-dione). Its infrared curve is identical with that of an authentic sample. B is 6β-hydroxy S (6β,17α,21-trihydroxy-4-pregnene-3,20-dione) as shown by agreement of physical properties with those recorded in the literature, particularly characteristic are the U.V. absorption curve and the optical rotation. C is 15β-hydroxy S (15β,17α,21-trihydroxy-4-pregnene-3,20-dione) as shown by the fact that its infrared spectrum is identical with that of an authentic sample.

Example 3

About 0.5–1.0 ml. of a 5 ml. aqueous suspension of spores and mycelium scraped from a test tube agar slant of Cariolus versicolor (Lederle D-10) are inoculated into 100 ml. of sterilized medium (5% dextrose, 2% corn steep liquor, and 0.2% K$_2$HPO$_4$) in a 500 ml. flask. The inoculated flasks are placed on a reciprocating shaker and incubated at 28° C. for 66 hours. After this period substance S is added, 20 mg. dissolved in 1 ml. of 70% ethyl alcohol per flask. Samples for chromatographic assay are taken at one day intervals: 10 ml. of broth plus mycelium are extracted with 25 ml. of ethyl acetate by shaking the mixture for 5 minutes. After standing to separate the layers the ethyl acetate extract is transferred to a conical centrifuge tube and the solvent evaporated in a warm water bath with the aid of an air jet. The dried residue is submitted to qualitative paper strip chromatographic assay and gives evidence of 3 definite chromatogram spots with $R_f$ values of 0.23, 0.36, and 0.63 in solvent system IXA indicative of 15β-hydroxy S, 6β-hydroxy S, and 14α-hydroxy S, respectively.

Example 4

The same fermentation conditions are used as described for Example 3, except that 21-hydroxyprogesterone is used as steroid substrate instead of Compound S.

| Culture | $R_f$ values in Solvent System XII | | | | | |
|---|---|---|---|---|---|---|
| (D-6) Polyporus cinnabarinus | | | 0.44 | 0.65 | | 0.80 | 0.85 |
| (D-15) Polyporus tulipiferus | | 0.35 | 0.44 | 0.62 | 0.68 | | |
| (D-107) Poria cocos | 0.15 | | 0.44 | 0.60 | 0.70 | | 0.85 |

The polarity of the product at $R_f$ 0.44 shows that the product can be 15β,21-dihydroxyprogesterone and that 6β,21-dihydroxyprogesterone and 14α,21-dihydroxyprogesterone both are likewise in the area of $R_f$ 0.60–0.65 in the solvent system used.

Example 5

A test tube agar slant of Poria cocos is washed with 4 ml. of a sterile saline solution. One ml. of the resulting suspension is used to inoculate a 100 ml. test tube containing 10 ml. of a medium consisting of 2.0% cerelose, 1.0% sodium chloride and 2.0% (w./v.) corn steep liquor. The tube is placed upon a reciprocating shaker at 28° C. for 96 hours. At this point 2 mg. of Reichstein's Substance S is added in 0.2 ml. of ethanol and the fermentation allowed to continue for 72 hours. At this time the tube is harvested and the mash extracted twice with double volumes of methylene dichloride. The combined extracts are concentrated and then subjected to paper chromatography. The chromatogram showed three products with mobilities consistent with the interpretation that they are the 6β,14α, and 15β-monohydroxyl derivatives of Substance S.

Example 6

A test tube agar slant of Poria cocos is washed with 4 ml. of a sterile saline solution. One ml. of the resulting suspension is used to inoculate a 100 ml. test tube containing 10 ml. of a medium consisting of 2.0% cerelose, 1.0% sodium chloride and 2.0% (w./v.) corn steep liquor. The tube was placed upon a reciprocating shaker at 28° C. for 96 hours. At this point 2 mg. of 21-hydroxyprogesterone is added in 0.2 ml. of ethanol and the fermentation allowed to continue for 72 hours. At this time the tube is harvested and the mash extracted twice with double volumes of methylene dichloride. The combined extracts are concentrated and then subjected to paper chromatography. The chromatogram showed more polar products with mobilities consistent with the interpretation that the 6β,14α, and 15β-monohydroxyl derivatives of 21-hydroxyprogesterone are produced.

We claim:
1. A process for the 6β,14α and 15β-monohydroxylation of 21-hydroxy-3,20-diketopregnenes which comprises subjecting said pregnenes to the fermentative enzymatic action of a fungus of the group consisting of Coriolus versicolor, Polyporus tulipiferus, Polyporus cinnabarinus and Poria cocos.

2. A process for the 6β,14α,15β-monohydroxylation of 17α,21-dihydroxy-4-pregnene-3,20-dione which comprises subjecting said pregnene to the fermentative enzymatic action of Polyporus tulipiferus.

3. A process for the 6β,14α,15β-monohydroxylation of 17α,21-dihydroxy-4-pregnene-3,20-dione which comprises subjecting said pregnene to the fermentative enzymatic action of Coriolus versicolor.

4. A process for the 6β,14α,15β-monohydroxylation of 17α,21-dihydroxy-4-pregnene-3,20-dione which comprises subjecting said pregnene to the fermentative enzymatic action of Poria cocos.

5. A process for the 6β,14α,15β-monohydroxylation of 21-hydroxy-progesterone which comprises subjecting 21-hydroxyprogesterone to the fermentative enzymatic action of *Polyporus cinnabarinus*.

6. A process for the 6β,14α,15β-monohydroxylation of 21-hydroxy-progesterone which comprises subjecting 21-hydroxyprogesterone to the fermentative enzymatic action of *Polyporus tulipiferus*.

7. A process for the 6β,14α,15β-monohydroxylation of 21-hydroxy-progesterone which comprises subjecting 21-hydroxyprogesterone to the fermentative enzymatic action of *Poria cocos*.

8. A process for the 6β,14α and 15β monohydroxylation of 21-hydroxy-3,20-diketopregnenes which comprises subjecting said pregnenes to the fermentative enzymatic action of *Coriolus versicolor*.

9. A process for the 6β,14α and 15β monohydroxylation of 21-hydroxy-3,20-diketopregnenes which comprises subjecting said pregnenes to the fermentative enzymatic action of *Polyporus tulipiferus*.

10. A process for the 6β,14α and 15β monohydroxylation of 21-hydroxy-3,20-diketopregnenes which comprises subjecting said pregnenes to the fermentative enzymatic action of *Polyporus cinnabarinus*.

11. A process for the 6β,14α and 15β monohydroxylation of 21-hydroxy-3,20-diketopregnenes which comprises subjecting said pregnenes to the fermentative enzymatic action of *Poria cocos*.

No references cited.